United States Patent
Wallin

(10) Patent No.: US 12,151,908 B2
(45) Date of Patent: Nov. 26, 2024

(54) STORAGE AND RECLAIM SYSTEM FOR BULK MATERIAL

(71) Applicant: MACGREGOR SWEDEN AB, Gothenburg (SE)

(72) Inventor: Tomas Wallin, Enköping (SE)

(73) Assignee: MACGREGOR SWEDEN AB, Gothenburg (SE)

( * ) Notice: Subject to any disclaimer, the term of this patent is extended or adjusted under 35 U.S.C. 154(b) by 0 days.

(21) Appl. No.: 18/290,182

(22) PCT Filed: Jun. 3, 2022

(86) PCT No.: PCT/EP2022/065228
§ 371 (c)(1),
(2) Date: Nov. 10, 2023

(87) PCT Pub. No.: WO2022/268485
PCT Pub. Date: Dec. 29, 2022

(65) Prior Publication Data
US 2024/0270520 A1    Aug. 15, 2024

(30) Foreign Application Priority Data

Jun. 21, 2021 (EP) .................................... 21180543

(51) Int. Cl.
*B65G 67/60* (2006.01)
*B63B 25/04* (2006.01)
(Continued)

(52) U.S. Cl.
CPC ............ *B65G 67/606* (2013.01); *B63B 25/04* (2013.01); *B63B 27/22* (2013.01); *B65G 27/16* (2013.01); *B65G 2201/04* (2013.01)

(58) Field of Classification Search
CPC ......... B63B 27/22; B63B 27/19; B63B 25/04; B65G 27/16; B65G 27/20; B65G 27/32;
(Continued)

(56) References Cited

U.S. PATENT DOCUMENTS 1,942,839 A * 1/1934 Sheal ...................... B63B 27/22
414/142.5
2,170,258 A * 8/1939 Borch .................... B65D 88/72
222/196
(Continued)

FOREIGN PATENT DOCUMENTS

DE         102009022375 A1    11/2010

OTHER PUBLICATIONS

International Search Report and Written Opinion for co-pending International Application No. PCT/EP2022/065228, mailed Sep. 22, 2022 (8 pages).

*Primary Examiner* — Gregory W Adams
(74) *Attorney, Agent, or Firm* — Kagan Binder, PLLC

(57) ABSTRACT

A storage and reclaim system for bulk material includes a bulk material holding space having a bottom portion provided with a discharge port. The bottom portion includes an inclined support plate for supporting the bulk material and for assisting gravity induced feeding of the bulk material towards the discharge port. The support plate is supported by a support structure in a free-floating manner. One or more vibrators are connected to the support plate and configured to transfer vibrational energy to the support plate to induce a vibrational movement of the support plate. The discharge port includes one or more inclined discharge port plates. One or more vibrators are connected to each discharge port plate.

14 Claims, 6 Drawing Sheets

(51) Int. Cl.
   *B63B 27/22* (2006.01)
   *B65G 27/16* (2006.01)

(58) Field of Classification Search
   CPC ... B65G 67/606; B65G 2201/04; B01F 31/86;
   B01F 31/60; B01F 31/861; B24B 31/06
   USPC ...... 156/705; 366/114, 125; 414/142.3, 216;
   222/196
   See application file for complete search history.

(56) References Cited

U.S. PATENT DOCUMENTS

| | | | | |
|---|---|---|---|---|
| 2,229,037 | A * | 1/1941 | Boldman | B61D 7/32 |
| | | | | D15/147 |
| 2,560,480 | A * | 7/1951 | Rogers | F23K 3/00 |
| | | | | 222/203 |
| 3,003,733 | A * | 10/1961 | Peterson | B65G 27/00 |
| | | | | 248/223.41 |
| 3,009,587 | A * | 11/1961 | Pickrell, Jr. | B63B 27/22 |
| | | | | 414/141.9 |
| 3,567,186 | A * | 3/1971 | Niepelt | B28B 1/087 |
| | | | | 425/456 |
| 3,616,969 | A * | 11/1971 | Koizumi | G03G 15/0877 |
| | | | | 222/161 |
| 4,335,964 | A * | 6/1982 | Drake | F17D 3/12 |
| | | | | 366/156.1 |
| 4,522,500 | A * | 6/1985 | Hyer | B01F 31/86 |
| | | | | 366/113 |
| 4,546,872 | A * | 10/1985 | Musschoot | B65D 88/66 |
| | | | | 198/533 |
| 4,881,665 | A * | 11/1989 | McGuire | B65D 88/66 |
| | | | | 222/196 |
| 4,907,721 | A | 3/1990 | Poncet | |
| 5,353,966 | A * | 10/1994 | Stutz | B65D 88/68 |
| | | | | 222/203 |
| 5,533,650 | A * | 7/1996 | Conrad | B29C 48/286 |
| | | | | 222/161 |
| 5,813,754 | A * | 9/1998 | Williams | B01F 31/56 |
| | | | | 366/65 |
| 6,027,120 | A * | 2/2000 | Wojcinski | F41J 13/00 |
| | | | | 273/408 |
| 6,209,964 | B1 * | 4/2001 | Pinto | B60P 1/283 |
| | | | | 414/415 |
| 6,568,567 | B2 * | 5/2003 | McKenzie | B65D 88/28 |
| | | | | 222/413 |
| 10,329,103 | B1 | 6/2019 | Moen | |
| 2009/0260539 | A1 | 10/2009 | Poncet | |

* cited by examiner (Prior art) Fig. 1

STORAGE AND RECLAIM SYSTEM FOR BULK MATERIAL

CROSS REFERENCE TO RELATED APPLICATIONS

This application claims priority to International Application No. PCT/EP2022/065228, filed Jun. 3, 2022, which in turn claims priority from European Patent Application having application Ser. No. 21/180,543.7, filed on Jun. 21, 2021, both of which are incorporated herein by reference in their entireties for all purposes.

TECHNICAL FIELD

The present invention relates to a storage and reclaim system for bulk material. The system comprises a bulk material holding space having a bottom portion provided with a discharge port. The invention also relates to a use of the system and to a vessel, a land-based storage and a hopper including the system.

BACKGROUND ART

Today a substantial amount of cargo is shipped around the globe using large naval vessels or ships capable of traveling long distances over open sea. Similarly, a substantial amount of cargo is shipped more moderate distances using inland water ways, such as rivers and lakes. The large amount of cargo consequently brings about that large amount of cargo will have to be handled and stored e.g. in conjunction to being reloaded.

When shipping bulk cargo or load, such as coal or ore, bulk naval vessels or ships dedicated for loading bulk cargo are commonly used due to their capability of loading bulk cargo. Bulk vessels are commonly equipped with large cargo holds which are covered by some form of hatch or cover which is opened during loading and unloading of the cargo concerned. When handling bulk cargo, cranes equipped with buckets or similar are commonly used to handle the cargo.

Similarly, large land-based storage facilities are commonly used for storing bulk cargo. In such facilities bulldozers or similar are often used to distribute, reload and unload the bulk cargo.

Moreover, bulk cargo may temporarily be stored and reloaded in so-called hopper systems.

However, more efficient reloading or unloading of bulk cargo may be effectuated by using so-called self-unloader systems, which for example may be installed in vessels or storage facilities. In self-unloader systems the bulk cargo is automatically unloaded form the vessel or cargo space through gates arranged at the bottom of the space or cargo hold. In self-unloader systems, the space used for holding the cargo is typically equipped with steep inclined sidewalls along which the bulk cargo slides towards the gates arranged at the bottom. Form the gates, the bulk cargo is then typically transported away using conveyors, transporters, or feed screws.

In self-unloader systems the bulk cargo is prone to get stuck during unloading of the bulk cargo. There are several reasons for that the bulk cargo can get stuck during unloading. One reason resides in that the side walls of the space used for holding the cargo is not steep enough. Another reason is that the side walls of space used for holding the cargo exhibits a too high friction due to clogging or sticking of material. Yet another reason is that the bulk cargo forms walls when being unloaded. Yet another reason is that the bulk cargo forms arches e.g. over the gates. Yet another reason is that the material properties of the bulk cargo do not allow free flow due to high internal friction and for that reason arches e.g. over the gates. This means that the region closest to the gate may be emptied but the material forms a self-supporting arch above the gate, hence resulting in that the bulk cargo cannot easily be unloaded.

In order to reduce the above problems, it is common practice to use steep sidewalls and to employ the sidewalls with vibrators attached thereto. This arrangement reduces the risk of the bulk cargo getting stuck during unloading. However, other drawbacks typically arise when utilizing this approach.

FIG. 1 schematically illustrates a partial perspective cross sectional view of a ship according to prior art. The depicted ship, mainly shown in phantom, has a deadweight tonnage of about 8600 tonnes and a gross load capacity of about 11300 cubic meters. More specifically, FIG. 1 illustrates the cargo hole of a bulk loader equipped with a self-unloader system. As can be seen in FIG. 1, the steep side walls of the cargo hole bring about that valuable space in the interior of the ship cannot be used for storing cargo at the sides of the ship as well as in the middle. Moreover, in order to not waste too much space, the ship has been equipped with two parallel sets of gates, one on the starboard side and one on the portside of the ship. The use of parallel gate sets results in that multiple sets of conveyors must be used below the gates. The use of multiple parallel conveyors results in that cross conveyors, extending in a transversal direction of the ship are needed to feed the bulk cargo to the C-shaped conveyor used to lift and transfer bulk cargo out of the ship. The use of multiple conveyors is both costly and increases the number of moving parts, hence increasing maintenance, risk of malfunction and costly downtime. Further, vibrators are attached to the steep sidewalls of the ship in FIG. 1. This arrangement of the vibrators results in undesired body sound or structure sound as well as premature material fatigue. A vibrator may induce as much as 300 kN of centripetal force of which a major portion is absorbed by the sidewalls and the support structure.

Similar or the same problems arise when utilising land-based self-unloader systems with steep sidewalls and vibrators and in hopper systems employed with steep sidewalls and vibrators.

US 2010/0272543 A1 suggests using less steep sidewalls in combination with an array of individual surface segments provided with vibrating units. The individual surface segments are in turn supported by a dedicated support structure in order to form a funnel like structure sloping towards an exit. The described system thus offers more load capacity. However, the described system is very complicated and expensive to build. Further, the described system still induces undesired body sound or structure sound as well as premature material fatigue owing form the vibrating units. By fixing the vibrating units in the support structure, the ability of the vibrating units to propagate vibrations to e.g. bulk material will be significantly hampered, hence reducing the effect of the vibrating units.

U.S. Pat. No. 4,907,721 discloses a bulk silo for grains and particulate material including a slandered floor which slanters towards a set of spouts. The slandered floor includes vibrators connected to plates for vibrating the same. Each spout is formed like a tunnel through which the grains or particulate material is allowed to flow towards a chain conveyor. Further, each spout is employed with gate for controlling a flow of grains therethrough. However, such spouts may be prone to clogging.

Hence, there is a need for an improved storage and reclaim system for bulk material.

SUMMARY OF THE INVENTION

With the above in mind, it is an object of the present invention to provide an improved storage and reclaim system for bulk material as well as a use of the system and a vessel, a land-based storage and a hopper including the system.

Another object is to provide such a storage and reclaim system for bulk material which occupies less space.

Another object is to provide such a storage and reclaim system for bulk material which simplifies unloading form the storage and reclaim system.

Another object is to provide such a storage and reclaim system for bulk material which allow for handling of bulk material with high internal friction.

Another object is to provide such a storage and reclaim system for bulk material which reduces body sounds.

Another object is to provide such a storage and reclaim system for bulk material which reduces material fatigue of the system and surrounding components.

Another object is to provide such a storage and reclaim system for bulk material which reduces the number of auxiliary components used when unloading bulk cargo form the storage and reclaim system.

To achieve at least one of the above objects and also other objects that will be evident from the following description, a storage and reclaim system for bulk material having the features defined in claim 1 is provided according to the present inventive concept. A vessel including a storage and reclaim system for bulk material is provided according to claim 11. A land-based storage including a storage and reclaim system for bulk material is provided according to claim 12. A hopper including a storage and reclaim system for bulk material is provided according to claim 13. A use of a storage and reclaim system is provided according to claim 14. Preferred variations of the inventive concept will be evident from the dependent claims.

More specifically, according to a first aspect, there is provided a storage and reclaim system for bulk material, said system comprising: a bulk material holding space having a bottom portion provided with a discharge port, wherein the bottom portion comprises an inclined support plate for supporting the bulk material and for assisting gravity induced feeding of the bulk material towards the discharge port, a support structure supporting the support plate, and one or more vibrators connected to the support plate and configured to transfer vibrational energy to the support plate to induce a vibrational movement of the support plate, wherein the support plate is inclined with an angle in the range of 15-25 degrees with respect to a horizontal plane, wherein the support plate is supported by the support structure in a free-floating manner, characterised in that the discharge port comprises one or more inclined discharge port plates for guiding the bulk material and for assisting gravity induced feeding of the bulk material towards the discharge port, wherein each discharge port plate is inclined with an angle in the range of 30-70 degrees with respect to a horizontal plane, wherein one or more vibrators are connected to each discharge port plate and configured to transfer vibrational energy to the discharge port plate to induce a vibrational movement of the discharge port plate, and wherein each discharge port plate is supported by the support structure in a free-floating manner.

Hereby an improved storage and reclaim system for bulk material is provided.

The storage and reclaim system is designed for, and hence suitable to be used with bulk material in general.

Further, the storage and reclaim system is advantageous in that it is designed to be capable of handling bulk materials exhibiting a high internal friction also referred to as a high internal sticking. Hence, the storage and reclaim system is designed to efficiently handle bulk materials which are prone to sticking and clogging during handling such as unloading. Non-limiting examples of such bulk materials are wood chips and saw dust which are prone to arching and walling during handling.

By "arching" is meant that the bulk material may form a self-supporting arch traversing a void space. This means that the bulk material may form an arch for instance over a discharge port such that the arch prevents the bulk material from reaching the discharge port.

By "walling" is meant that the bulk material forms a self-supporting steep wall. This means that the bulk material may form a wall-like structure which may prevent the material from flowing towards e.g. a discharge port. For instance, wood chips may form walls having more or less vertical faces which may be exceed ten meters in height.

The storage and reclaim system comprises a bulk material holding space. The bulk material holding space is typically designed to hold bulk cargo during transport, storage and/or handling. The bulk cargo holding space may for example be a cargo hold of a vessel or ship, a warehouse or storage facility, a hopper, a storage tower, a train carriage or a truck wreckage.

Hence, the bulk cargo may be static in the bulk material holding space for prolonged time such as when transported in a ship or when stored in a storage facility. Further, the bulk cargo may flow through the bulk material holding space or be static for only a short period of time such as when handled in a hopper. The size, shape and design of the bulk material holding space may consequently vary greatly.

The bulk material holding space has a bottom portion which is provided with a discharge port or gate. The discharge port is typically used to extract bulk material from the bulk material holding space by opening the discharge port such that the bulk material is allowed to flow or fall out of the bulk material holding space through the discharge port.

The bottom portion of the bulk material holding space comprises an inclined support plate for supporting the bulk material and for assisting gravity induced feeding of the bulk material towards the discharge port. Hence, the bulk material may travel along the inclined support plate towards the discharge port while being supported by the inclined support plate. The inclination of the inclined support plate brings about that the gravity force acting on the bulk material will assist the bulk material in being fed towards the discharge port.

The support plate is supported by a support structure. The support structure may be any structure capable of supporting the support plate. The Support structure may include one or more plates supporting the support plate. The Support structure may include one or more beams supporting the support plate. The Support structure may include one or more grids supporting the support plate. The Support structure may include a combination of one or more load carrying structures such as plates, beams, and grids.

One or more vibrators are connected to the support plate. The vibrators are configured to transfer vibrational energy to the support plate. The vibrators may thus induce a vibrational movement of the support plate. The vibrational movement of the support plate will propagate into the bulk material supported by the support plate. The vibrational movement propagated into the bulk material will consequently vibrate or shake the bulk material or at least a part of the bulk material. By vibrating the bulk material, arching and walling of the bulk material is counteracted hence resulting in that the bulk material is less prone to sticking and clogging. By vibrating the bulk material, arches and wall of the bulk material may be made to collapse hence resulting in that the bulk material is counteracted from sticking and clogging.

Any number of vibrators including one may be used to advantage. The vibrators may be of any suitable kind. The vibrators may be hydraulically driven. The vibrators may be pneumatically driven. The vibrators may be electrically driven. The vibrators may be electromagnetically driven. The vibrators may be adjustable. A vibration power of the vibrators may be adjusted. A vibration force of the vibrators may be adjusted. A vibration amplitude of the vibrators may be adjusted. A vibration frequency of the vibrators may be adjusted. A vibration time of the vibrators may be adjusted to give a few non-limiting examples. The vibrators may be adjusted based on the bulk material at hand such that an efficient feeding of the bulk material towards the discharge port is achieved. For instance, the vibrational amplitude may have to be increased for materials having large internal friction. Similarly, the vibrational amplitude may potentially be lowered for materials having a limited internal friction.

The support plate is inclined with an angle in the range of 15-25 degrees with respect to a horizontal plane. Hereby an efficient storage and reclaim system may be realized while using less space.

The support plate is supported by the support structure in a free-floating manner.

By "free floating manner" is meant that the support plate is supported by the support structure such that it may vibrate independently of the support structure or may vibrate substantially independently of the support structure. The support plate is thus supported in a fashion where its contact surface with the support structure is free or substantially free. In other words, the support plate may rest freely on the support structure. The support plate may be restricted to move in a plane thereof with respect to the support structure. This arrangement of the support plate brings about that at least a central major portion of the support plate is free of any connections or couplings to other entities or objects such as the support structure.

By this arrangement, the vibrators may efficiently transfer vibrational energy the support plate while limiting the amount of vibrational energy being transferred to the support structure. Hence, less vibrations are consequently transferred to the surroundings which efficiently mitigates body sounds and premature material fatigue. For natural reasons, a limited amount of the vibrational energy transferred by the vibrators may be transferred to the surroundings.

Since the support plate is supported in a free-floating manner, vibrational energy may be efficiently transferred to the bulk cargo and even so with a significantly increased amplitude. This brings about that arching, and walling may be mitigated even more efficiently and that the bulk material may travel more easily towards the discharge port. Moreover, since the support plate is supported in a free-floating manner, materials with high internal friction which cannot flow without added energy in the form of vibration may advantageously be handled by the storage and reclaim system. Hence, the inclination of the support plate may be reduced bringing about that less space is occupied by the storage and reclaim system. As a result, the bulk material holding space may be made wider without wasting too much space. As a further result of the reduced inclination of the support plate, arching of the bulk material may be mitigated.

The discharge port comprises one or more inclined discharge port plates for guiding the bulk material and for assisting gravity induced feeding of the bulk material towards the discharge port. Each discharge port plate is inclined with an angle in the range of 30-70 degrees with respect to the horizontal plane. By this arrangement the discharge of the bulk material through the discharge port may be facilitated. The combination of a support plate and one or more inclined discharge port plates brings about that the bulk material may flow more easily out through the discharge port. If the support plate is inclined less than the one or more inclined discharge port plates, arching of the bulk material may be further counteracted. Arching may be reduced since the support plate will exhibit a reduced capability of receiving forces transversal to a horizontal plane. In other words, the support plate will not be able to support a material arch as effective as when steep side walls are used.

One or more vibrators are connected to each discharge port plate. The one or more vibrators are configured to transfer vibrational energy to the discharge port plate to induce a vibrational movement of the discharge port plate. Each discharge port plate is supported by the support structure in a free-floating manner. By this arrangement the discharge of the bulk material through the discharge port may be facilitated further.

Any number of vibrators including one may be used to advantage. Reference regarding the vibrators and how each discharge port plate is supported by the support structure in a free-floating manner is made to the above.

The support structure may comprise a backing plate, wherein the support plate rests on the backing plate, which is advantageous in that the support plate may be supported by the backing plate in a secure manner. By supporting one plate on another plate, the contact surface between the two plates may be maximized. This may reduce vibration induced wear and/or the risk of deforming the support plate.

Each vibrator may be connected to a major surface of the support plate facing away from the bulk material holding space, which is advantageous in that the vibrators or vibrator may efficiently transfer vibrational energy to the support plate to induce a vibrational movement of the support plate without interfering with the bulk material holding space. Hence, the vibrators may not occupy any space in the bulk material holding space. The vibrators may not disturb a flow of bulk material being fed towards the discharge port of the bulk material holding space.

Each vibrator may extend through an opening in the support structure, which is advantageous in that the vibrators or vibrator may efficiently transfer vibrational energy to the support plate to induce a vibrational movement of the support plate with a minimal impact on the support structure.

The system may further comprise a clamping profile clamping a peripheral portion of the support plate and a peripheral portion of the support structure, which is advantageous in that the support plate may be held in position relative to the support structure. Further, the use of a clamping profile may result in that the support plate is free to move in a plane thereof. The use of a clamping profile may result in that the support plate is free to move a limited extent in a plane thereof. Furthermore, the use of a clamping profile may bring about that the support plate is sealed with respect to the support structure and/or any underlying structure such that the bulk material is counteracted from unintentionally exiting the bulk material holding space.

The support plate may be inclined with an angle in the range of 5-30 degrees with respect to a horizontal plane. The support plate may be inclined with an angle in the range of 17-23 degrees with respect to a horizontal plane. The support plate may be inclined with an angle of about 20 degrees with respect to a horizontal plane.

The support plate may be inclined with an angle in the range of 5-40 degrees with respect to a horizontal plane. The support plate may be inclined with an angle in the range of 5-50 degrees with respect to a horizontal plane. The support plate may be inclined with an angle in the range of 5-60 degrees with respect to a horizontal plane. The support plate may be inclined with an angle in the range of 20-30 degrees with respect to a horizontal plane. The support plate may be inclined with an angle of about 30 degrees with respect to a horizontal plane.

The system may further comprise an intermediate layer arranged between the support structure and the support plate, the intermediate layer having sound attenuating properties, vibration isolating properties and/or wear resistant properties. By arranging an intermediate layer between the support structure and the support plate several advantages may be achieved. The intermediate layer may have sound attenuating properties, hence reducing an overall sound level and/or mitigating propagation of undesired noise. The intermediate layer may have vibration isolating properties, hence reducing an overall vibration level of the support structure and any entities connected thereto. Further, propagation of undesired vibrations may be reduced. An intermediate layer between the support structure and the support plate may reduce body sounds further. An intermediate layer between the support structure and the support plate may reduce material fatigue further. The intermediate layer may have wear resistant properties, hence reducing wear of the support structure and the support plate. Examples of suitable materials for the intermediate layer include rubber, natural rubber, synthetic rubber, polymers, PTFE, and steel-based energy absorbing materials. The intermediate layer may include a plurality of materials. The intermediate layer may include a plurality of layers arranged on top of each other. The plurality of layers may or may not be connected to each other. The plurality of layers may have different properties including sound attenuating properties, vibration isolating properties and wear resistant properties.

The system may further comprise an additional inclined support plate for supporting the bulk material and for assisting gravity induced feeding of the bulk material towards the discharge port form an opposite side thereof, which is advantageous in that a discharge port may be fed with material from more than one direction.

The additional support plate may comprise one or more vibrators connected to the support plate and configured to transfer vibrational energy to the support plate to induce a vibrational movement of the support plate, wherein the additional support plate is supported by the support structure in a free-floating manner. Advantages related to the additional support plate is largely analogous to those of the support plate why reference is made to the above.

Each vibrator may be independently controllable, which is advantageous in that the vibrational movement of the support plate, if present the discharge port plate and if present the additional support plate may be controlled such that an efficient gravity induced feeding of the bulk material towards the discharge port is achieved. It is thus possible to induce a vibrational movement at a certain area of the support plate if present the discharge port plate and if present the additional support plate. It is thus possible to operate the vibrators in a certain sequence aiming at achieving an efficient feeding of the bulk material towards the discharge port. Moreover, properties of an induced vibrational movement may be altered to suit different needs. For instance, amplitude, frequency, and operation time may be controlled for each vibrator independently. The fact that each vibrator may be independently controllable also brings about that energy may be saved since the vibrators may only be operated when needed. The fact that each vibrator may be independently controllable also brings about that energy may be saved since the vibrators may only be operated at certain power. The fact that each vibrator may be independently controllable also brings about that undesired body sound and/or vibrations may be reduced since the vibrators may only be operated when needed.

The system may further comprise a conveyor arranged below the bottom portion of the bulk material holding space for receiving bulk material from the bulk material holding space via the discharge port, which is advantageous in that the bulk material of the bulk material holding space may be conveyed away after leaving the bulk material holding space via the discharge port. The bulk material may for instance be conveyed out of a vessel or a storage facility or warehouse.

According to another aspect of the invention, there is provided a vessel comprising a storage and reclaim system according to the first aspect. In general, features of this aspect provide similar advantages as discussed above in relation to the first aspect. Consequently, said advantages will not be repeated in order to avoid undue repetition.

According to another aspect of the invention, there is provided a land-based storage comprising a storage and reclaim system according to the first aspect. In general, features of this aspect provide similar advantages as discussed above in relation to the first aspect. Consequently, said advantages will not be repeated in order to avoid undue repetition. However, it may additionally be mentioned that a land-based storage according the invention may have a significantly reduced height as compared to prior art land-based storages. A reduced height may in turn result in an overall increased capacity of the land-based storage.

According to another aspect of the invention, there is provided a hopper comprising a storage and reclaim system according to the first aspect. In general, features of this aspect provide similar advantages as discussed above in relation to the first aspect. Consequently, said advantages will not be repeated in order to avoid undue repetition. However, it may additionally be mentioned that a hopper according the invention may have a significantly reduced height as compared to prior art hoppers. A reduced height may in turn result in an overall increased capacity of e.g. load system including a grabber attached to a crane, since the crane may not have to hoist the grabber as high as when using a prior art hopper. Another advantage resides in that the hopper may have a reduced weight and may include less material as compared to a prior art hopper.

According to another aspect of the invention, there is provided a use of a storage and reclaim system according to the first aspect for handling of bulk material chosen from group consisting of: wood chips, wood pellets, sawdust, coal, ore, gypsum rock, bauxite, alumina, cement, sand, gravel, crushed rock, salt, grains and aggregates. Hence, the storage and reclaim system according to the first aspect may be used for a large variety of materials. In general, features of this aspect provide similar advantages as discussed above in relation to the first aspect. Consequently, said advantages will not be repeated in order to avoid undue repetition.

BRIEF DESCRIPTION OF THE DRAWINGS

The above, as well as additional objects, features and advantages of the present inventive concept, will be better understood through the following illustrative and non-limiting detailed description of preferred variants of the present inventive concept, with reference to the appended drawings, where the same reference numerals will be used for similar elements, wherein.

DETAILED DESCRIPTION

Figure 1:
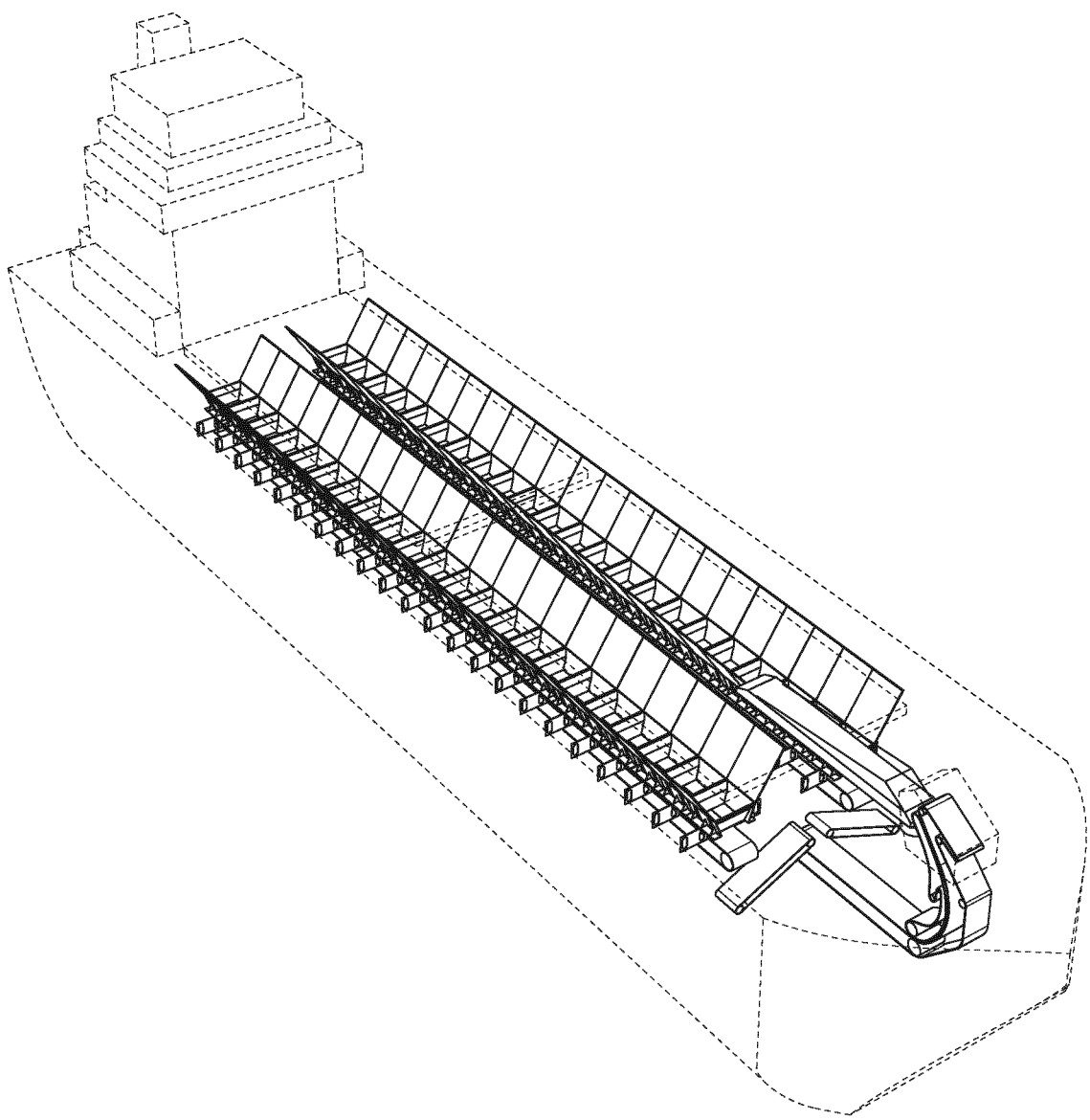
FIG. 1 conceptually illustrates a partial perspective cross sectional view of a ship according to prior art equipped with a self-unloader system.

The present inventive concept will now be described more fully hereinafter with reference to the accompanying drawings, in which preferred variants of the inventive concept are shown. This inventive concept may, however, be embodied in many different forms and should not be construed as limited to the variants set forth herein; rather, these variants are provided for thoroughness and completeness, and fully convey the scope of the inventive concept to the skilled person. Like reference numerals refer to like elements throughout the description.

Initially a storage and reclaim system 100 will be described with reference to FIGS. 2-4. The storage and reclaim system 100 will be described in a context where the storage and reclaim system 100 is installed in a vessel 200. However, the storage and reclaim system 100 may be used in a number of different applications and application areas. Examples of this will be described below with reference to FIGS. 5 and 6. Those described examples are however to be considered as non-limiting meaning that the storage and reclaim system 100 may be equally well be used in e.g. a warehouse, a storage tower, a train carriage, a truck wreckage or similar.

Figure 2:
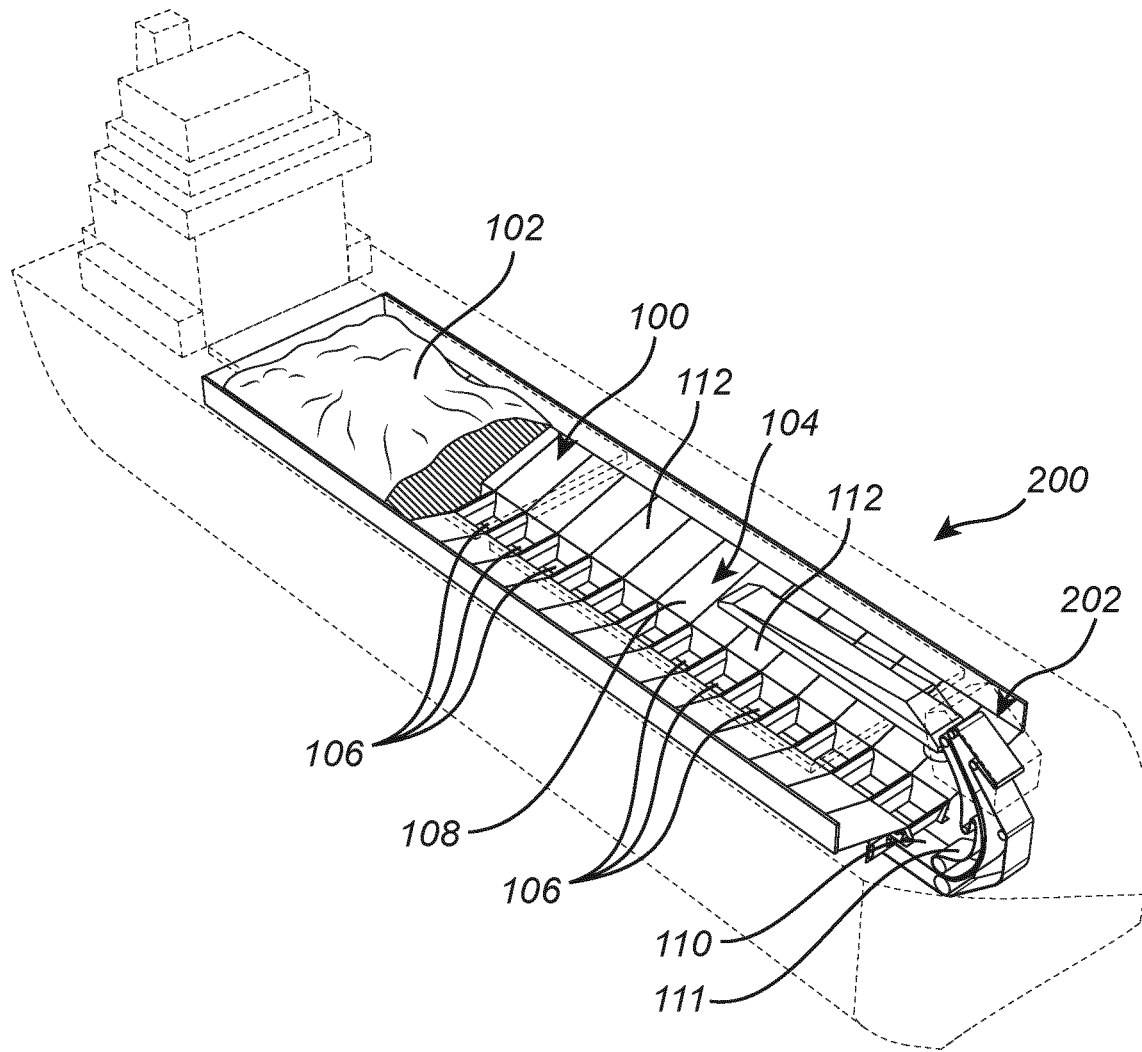
FIG. 2 conceptually illustrates a partial perspective cross sectional view of a vessel equipped with storage and reclaim system according to the present inventive concept.

The vessel 200 depicted in FIG. 2, mainly shown in phantom, is a large naval vessel 200 in form of a bulk loader having a deadweight tonnage of about 8600 tonnes and a gross load capacity of about 12500 cubic meters. The vessel 200 is consequently designed to transport bulk material 102 in its material holding space 104 commonly referred to as a cargo hole or a cargo hold. The material holding space 104 may be sectionalised and hence include several portions together forming the material holding space 104.

The vessel 200 is of a so-called self-unloader type meaning that the bulk material 102 may be unloaded from the material holding space 104 automatically by means of a self-unloader system 202 installed in the vessel 200.

The self-unloading system 202 includes among other things the storge and reclaim system 100.

The depicted self-unloading system 202 is a permanently installed system which was installed in the vessel 200 on the wharf when the vessel 200 was built. However, existing vessels may advantageously be retrofitted with self-unloading systems including a storge and reclaim system 100 according to the present inventive concept. Similarly, a storge and reclaim system 100 according to the present inventive concept may advantageously be retrofitted in other applications and application areas.

The bulk material 102 present in the material holding space 104 may be automatically unloaded from the material holding space 104 through a number of discharge ports 106 provided at the bottom of the material holding space 104. In other words, a bottom portion 108 of the material holding space 104 is provided with discharge ports 106. The discharge ports 106 are commonly referred to as gates. The number of discharge ports 106 may vary greatly e.g. depending on the size of the vessel 200 at hand. Tenths and even hundreds of discharge ports 106 may be used to advantage. A single discharge port 106 may be used to advantage e.g. in a small vessel, in a hopper or a storage tower.

The discharge ports 106 of the depicted vessel 200 are arranged along a longitudinal direction of the vessel 200. The discharge ports 106 of the depicted vessel 200 are arranged along a centre line of the vessel 200. Each discharge port 106 may be opened and closed individually. A plurality of discharge ports 106 may be opened and closed at the same time. However, when unloading bulk material 102 from the material holding space 104 it is common practice to open one discharge port 106 at the time.

Each discharge port 106 may as depicted be located above a conveyor 110. Hence, the conveyor 110 is arranged below the bottom portion 108 of the bulk material holding space 104 for receiving bulk material 102 from the bulk material holding space 104 via the discharge ports 106.

At a front end of the vessel 200, the conveyor 110 bends upwards in a C-shape where the conveyor 110 meets and is backed by a lifting conveyor 111. Hence, bulk material 102 traveling on the conveyor 110 is when reaching a front end of the vessel 200 pressed and held between the conveyor 110 and the lifting conveyor 111 such that the bulk material is lifted upwards along the C-shape and further out of the vessel 200. About 500 cubic meters of cargo may be unloaded from the vessel 200 by the conveyor 110 and the lifting conveyor 111. The conveyor 110 may for instance end at a further conveyor arranged above deck of the vessel 200. The conveyor 110 may for instance end at a transport arm arranged above deck of the vessel 200. The conveyor 110 may for instance end at a transport screw arranged above deck of the vessel 200.

When a discharge port 106 is opened, bulk material 102 may consequently fall down on the conveyor 110 and travel along the conveyor 110 until being lifted upwards and out of the vessel 200 by the conveyor 110 and the lifting conveyor 111. In order to have control of the amount of bulk material 102 on the conveyor and to avoid stacking of too much bulk material 102 at a certain point of the conveyor 110 one discharge port 106 is advantageously opened at time.

Figure 3:
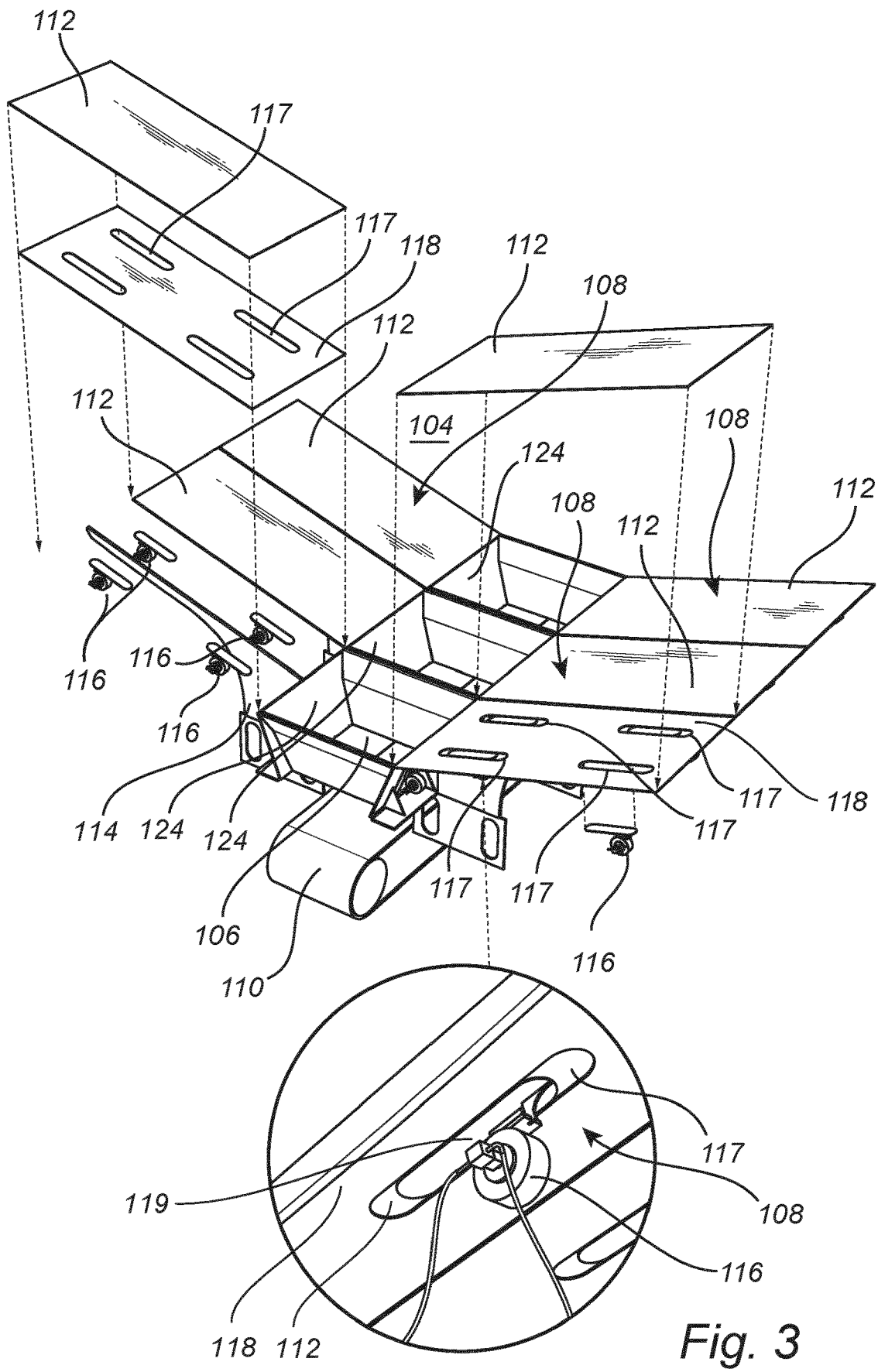
FIG. 3 conceptually illustrates a perspective view of a portion of the cargo hole of the vessel of FIG. 2.

As can be seen in FIG. 3, the bottom portion 108 of the depicted bulk material holding space 104 is employed with a plurality of modules each forming part of storage and reclaim system 100 which in turn forms part of the self-unloading system 202. Each module of the depicted kind in FIG. 3 includes opposite material supporting surfaces in form of support plates 112.

Figure 4:
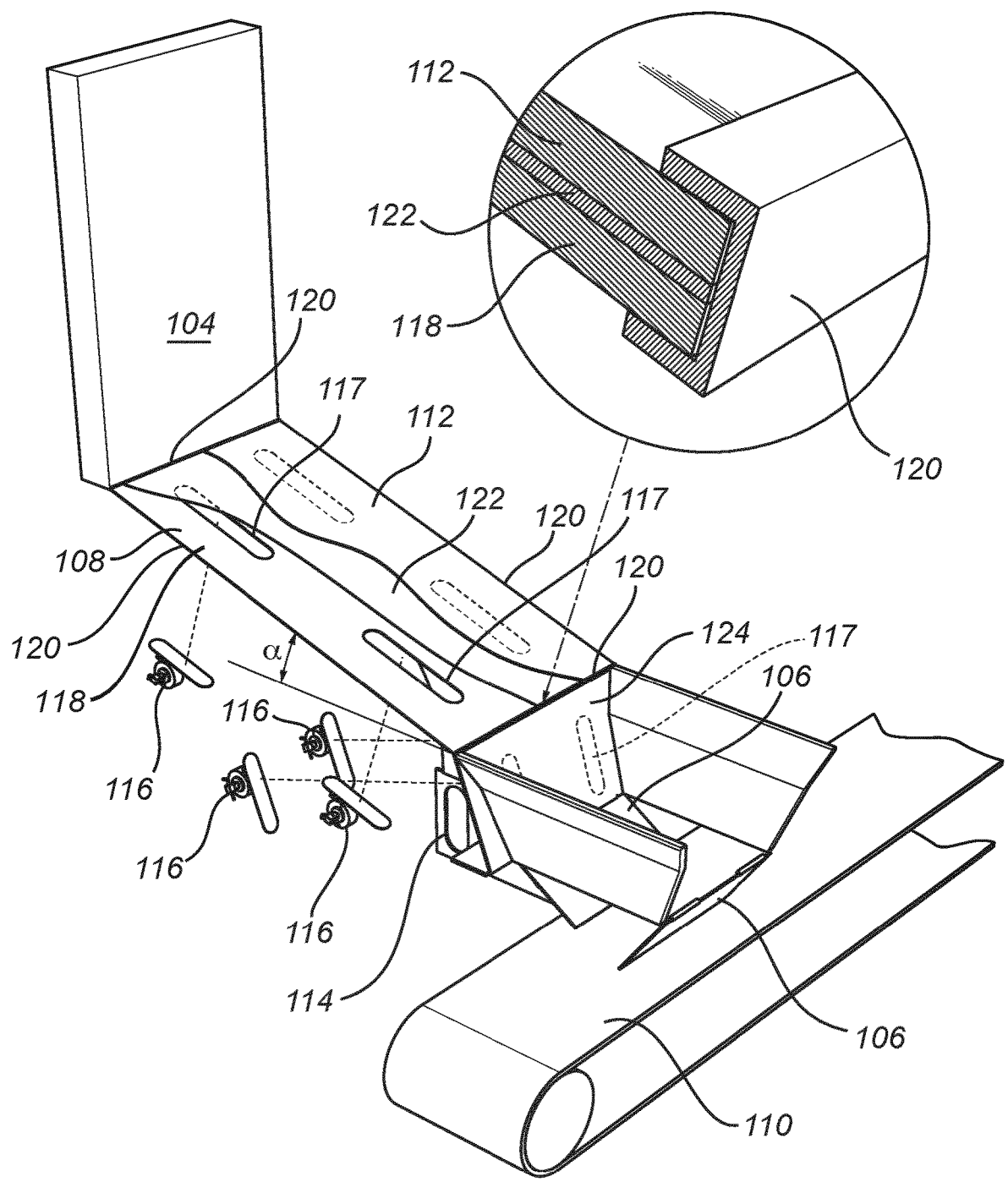
FIG. 4 conceptually illustrates a perspective view of a portion of a storage and reclaim system according to the present inventive concept.

In FIG. 4 one side, e.g. a starboard side, of a module is depicted. The depicted arrangement of FIG. 4 thus corresponds to a portion of the storage and reclaim system 100 of the self-unloading system 202. However, the depicted arrangement of FIG. 4 may very well form a complete storage and reclaim system 100 according to the present inventive concept. In view of this, the arrangement depicted in FIG. 4 will in the following be referred to a storage and reclaims system 100 although the arrangement forms part of the overall storage and reclaims system 100 of the depicted vessel 200.

Hence, in FIG. 4 it is illustrated a storage and reclaim system 100 for bulk material 102 The system 100 includes a bulk material holding space 104 having a bottom portion 108 as described above. The bottom portion 108 is provided with a discharge port 106. Further, the bottom portion 108 comprises an inclined support plate 112. The support plate 112 is consequently supporting the bulk material 102 in the bulk material holding space 104. The inclined support plate 112 has a further principal purpose apart from supporting the bulk material 102 namely, to assist gravity induced feeding of the bulk material 102 towards the discharge port 106. Hence, the bulk material 102 may flow or travel along the inclined support plate 112 towards the discharge port 106 while being influenced of the gravitational force. The support plate 112 in the depicted system 100 is a steel plate having a thickness of 10 mm. Other thicknesses of the support plate 112 may be used to advantage. For instance, the thickness of the support plate 112 may typically range from 2-20 mm. For instance, the thickness of the support plate 112 may advantageously range from 6-12 mm. Other materials such as aluminium and/or fibre reinforced polymer may be used to advantage in the support plate 112. The support plate 112 may include a plurality of materials.

The support plate 112 is supported by a support structure 114. The support structure 114 has a main purpose of withstanding and carrying the weight of the bulk material 102 present in the material holding space 104. The support structure 114 may be designed in different ways to fulfil this purpose. The support structure 114 may be advantageously include metal plates. The support structure 114 may be advantageously include metal beams. The support structure 114 may be advantageously include a metal grid. The support structure 114 may be advantageously be made of other suitable materials, such as fibre reinforced polymer materials.

In the depicted storage and reclaim system 100 of FIGS. 2-4, four vibrators 116 are connected to the support plate 112. The vibrators 116 are thus configured to transfer vibrational energy to the support plate 112 to induce a vibrational movement of the support plate 112. Hence, the support plate 112 will start to vibrate once one or more of the vibrators 116 are activated. The vibrators 116 may for example be hydraulic vibrators, pneumatic vibrators, electrical vibrators and/or electromagnetic vibrators. Vibrators 116 of different kinds may be used to advantage. Vibrators 116 of different kinds may be used in combination to advantage. The vibrators 116 may operate according to different working principles. Examples of suitable working principles include, counter-rotating unbalance motors, dual unbalanced exciter gearwheels, linear vibration and triple shaft unbalance exciter designs. The vibrators 116 may operate according to different vibration motions. Examples of suitable vibration motions include linear motions, circular motions, and elliptical motions. The speed and stroke of the vibrators 116 may be adjusted. The speed and stroke of the vibrators 116 may be adjusted individually. The speed and stroke of the vibrators 116 may be adjusted depending on material properties of the bulk material 102 at hand. Typical vibrational G-forces may be 3G to 7G.

The support plate 112 is supported by the support structure 114 in a free-floating manner. Hence, the vibrators 116 may thus transfer vibrational energy to the support plate 112 while influencing the support structure to a limited extent. In other words, the vibrators 116 may to induce a vibrational movement of the support plate 112 while only slightly affecting the support structure 114. The free-floating arrangement of the support plate 112 on the support structure 114 may consequently bring about that the amount of vibrations transferred to the support structure 114 may be significantly reduced. As a result of this vibrations and body sound in the vessel 200 may be significantly reduced. As a further result material fatigue and premature failure of components of the vessel 200 including the support structure 114 may be significantly reduced.

Further, the induced vibrational movement of the support plate 112 may consequently be transferred to the bulk material 102 supported by the support plate 112. The induced vibrational movement of the support plate 112 may consequently counteract arching and walling of the bulk material 102. The so induced vibrational movement of the support plate 112 may consequently break arches and/or walls formed in the bulk material 102. Hence, the so induced vibrational movement of the support plate 112 may further assist gravity induced feeding of the bulk material 102 towards the discharge port 106.

As is understood form the above, the system 100 typically include an additional inclined support plate 112, apart from the support plate 112 depicted in FIG. 4, for supporting the bulk material 102 and for assisting gravity induced feeding of the bulk material 102 towards the discharge port 106 form an opposite side thereof. Also as understood form the above, the additional support plate 112 typically includes one or more vibrators 116 connected thereto. The vibrators 116 are thus configured to transfer vibrational energy to the additional support plate 112 correspondingly to induce a vibrational movement of the additional support plate 112. Also as understood form the above, the additional support plate 112 is typically supported by the support structure 114 in a free-floating manner.

The depicted support structure 114 comprises a backing plate 118. The support plate 112 rests on the backing plate 118. The backing plate 118 in the depicted system 100 is a steel plate having a thickness of 10 mm. Other thicknesses of the backing plate 118 may be used to advantage. For instance, the thickness of the backing plate 118 may typically range from 8-20 mm. Other materials such as aluminium and/or fibre reinforced polymer may be used to advantage in the backing plate 118. The backing plate 118 may include a plurality of materials.

In other variants the support plate 112 may for instance rest on beams or on a grid.

Each depicted vibrator 116, of the four vibrators 116, is connected to a major surface of the support plate 112 facing away from the bulk material holding space 104. In other words, the vibrators 116 are all arranged on an underside of the support plate 112. To realize this, each depicted vibrator 116 extends through an opening 117 in the support structure. This arrangement of the vibrators 116 brings about that the vibrators are all located outside of the bulk material holding space 104 having. Hence, the presence of the vibrators 116 will not negatively influence how the bulk material 102 is fed towards the discharge port 106.

Each vibrator 116 may typically be connected to a bracket 119 which extends through the opening 117. Each vibrator 116 may typically be connected to the bracket 119 by being screwed or welded to the bracket 119. The bracket 119 may typically be connected to the support plate 112 by being welded or screwed to the support plate 112.

In the depicted system 100, a clamping profile 120 clamping a peripheral portion of the support plate 112 and a peripheral portion of the support structure 114 is provided. Hence, the clamping profile 120 clamps respective peripheral portions such that the peripheral portion of the support plate 112 and the peripheral portion of the support structure 114 are held or pressed together. The depicted claiming profile 120 has a general C-shape. Other shapes of the clamping profile 120 may be used to advantage for instance depending on the design or need at hand. By this arrangement, the support plate 112 may be held in place with respect to the support structure 114 while still being free to move in a plane thereof. More specifically, the support plate 112 is free to move a limited extent in a plane thereof with respect to the support structure 114. Moreover, the use of a clamping profile 120 brings about that the support plate 112 is sealed with respect to the support structure 114 and any underlying structure. This means that the bulk material 102 is counteracted from unintentionally exiting the bulk material holding space 104 which in turn means that the bulk material 102 is counteracted from entering between the support plate 112 and the support structure 114 which would otherwise risk influencing the system 100 negatively.

The clamping profile 120 may extend along one or more of the edges of the support plate 112. The clamping profile 120 may extend along all edges of the support plate 112. The clamping profile 120 may extend along portions of one or more of the edges of the support plate 112. In other words, the clamping profile 120 may be formed of a number of segments together forming the clamping profile 120. The clamping profile 120 may be provided at a lowermost edge of the support plate 112 such that the support plate 112 is counteracted or prevented from sliding downwards due to its inclination.

In the depicted system 100 the support plate 112 is inclined with an angle α of 20 degrees with respect to a horizontal plane. Other angles α within the range of 5-30 degrees with respect to a horizontal plane may be used to advantage. By utilizing an angle α of 20 degrees with respect to a horizontal plane a significant amount of valuable space may be saved. Hence, the bulk material holding space 104 may be made larger as compared to when steep sidewalls according to prior art are used. Owing for instance from the free-floating arrangement of the support plate 112 and the vibrators 116 arranged thereon, the support plate 112 may exhibit a significantly smaller angle α with respect to a horizontal plane while the bulk material 102 may still be fed towards the discharge port 106 in a gravity assisted manner.

In the depicted system 100 an intermediate layer 122 is arranged between the support structure 114 and the support plate 112. Hence, an intermediate layer 122 may be arranged between the support structure 114 and the support plate 112. The intermediate layer 122 in the depicted system 100 is a rubber sheet having a thickness of 10 mm. Other thicknesses of the intermediate layer 122 may be used to advantage. For instance, the thickness of the intermediate layer 122 may typically range from 2-50 mm.

The intermediate layer 122 may serve a number of purposes including sound attenuating, vibration isolation and wear protection. Other materials than rubber may be used to advantage in the intermediate layer 122, such as polymers, PTFE, and steel-based energy absorbing materials. The intermediate layer 122 may include a plurality of layers arranged on top of each other. The system 100 may or may not include an intermediate layer 122.

In the depicted system 100, the discharge port 106 further comprises one or more inclined discharge port plates 124. The discharge port plates 124 are consequently arranged in proximity to, and typically directly by, the discharge port 106. The discharge port plates 124 are used for guiding the bulk material 102 and for assisting gravity induced feeding of the bulk material 102 towards the discharge port 106. As can be seen in e.g. FIGS. 3 and 4 the discharge port plates 124 are arranged at a steeper angle than the support plate 112. More specifically, each discharge port plate 124 is inclined with an angle in the range of 30-70 degrees with respect to a horizontal plane. It is to be noted that the discharge port plates 124 may be omitted such that the bulk material may enter the discharge port directly from the support plate 112.

As can be seen in FIG. 4, the depicted discharge port plate 124 is provided with two vibrators 116. Any number of vibrators 116 may be used to advantage at the discharge port plates 124. Hence, the one or more vibrators 116 may consequently be connected to each discharge port plate 124. The vibrators 116 are thus configured to transfer vibrational energy to the discharge port plate 124 at hand to induce a vibrational movement of the discharge port plate 124. Further, each discharge port plate 124 may be supported by the support structure 114 in a free-floating manner. By supporting each discharge port plate 124 in a free-floating manner, the same or similar advantages to those discussed in relation to the support plate 112 may be achieved. Those advantages will consequently not be repeated here to avoid undue repetition.

The discharge port plates 124 may or may not be provided with vibrators 116. Some discharge port plates 124 may be provided with vibrators 116 while others not.

The vibrators 116 of the system 100 are advantageously independently controllable. It is thus possible to operate each vibrator 116 independently of any other vibrator in the system 100. It may also be possible to adjust operation parameters of each vibrator 116 independently of any other vibrator in the system 100. Operation parameters may include an amount of vibrational energy, a frequency, an operation time, an operation pattern to give a few non-limiting examples.

By having independently controllable vibrators 116 several advantages may be achieved. It may for instance be possible to control the vibrators 116 in a certain pattern to achieve an efficient feeding of the bulk material 102 towards the discharge port 106. A typical pattern may be to start the vibrator or vibrators 116 closest to the discharge port 106 first. The concerned vibrators 116 may be started first after a spontaneous gravity induced flow of the bulk material 102 has stopped in order to save energy and to not induce vibrations for an unnecessary long time. Vibrators 116 located farther away from the discharge port may then be started successively to feed bulk material 102 in an efficient manner along the support plate 112 towards the discharge port 106.

A bulk material level may be monitored in the bulk material holding space 104. The vibrators 116 may be controlled based on the bulk material level in the bulk material holding space 104. Sticking or clogging of bulk material 102 in the bulk material holding space 104 may be monitored. The vibrators 116 may be controlled based on bulk material 102 sticking or clogging in the bulk material holding space 104.

Figure 5:
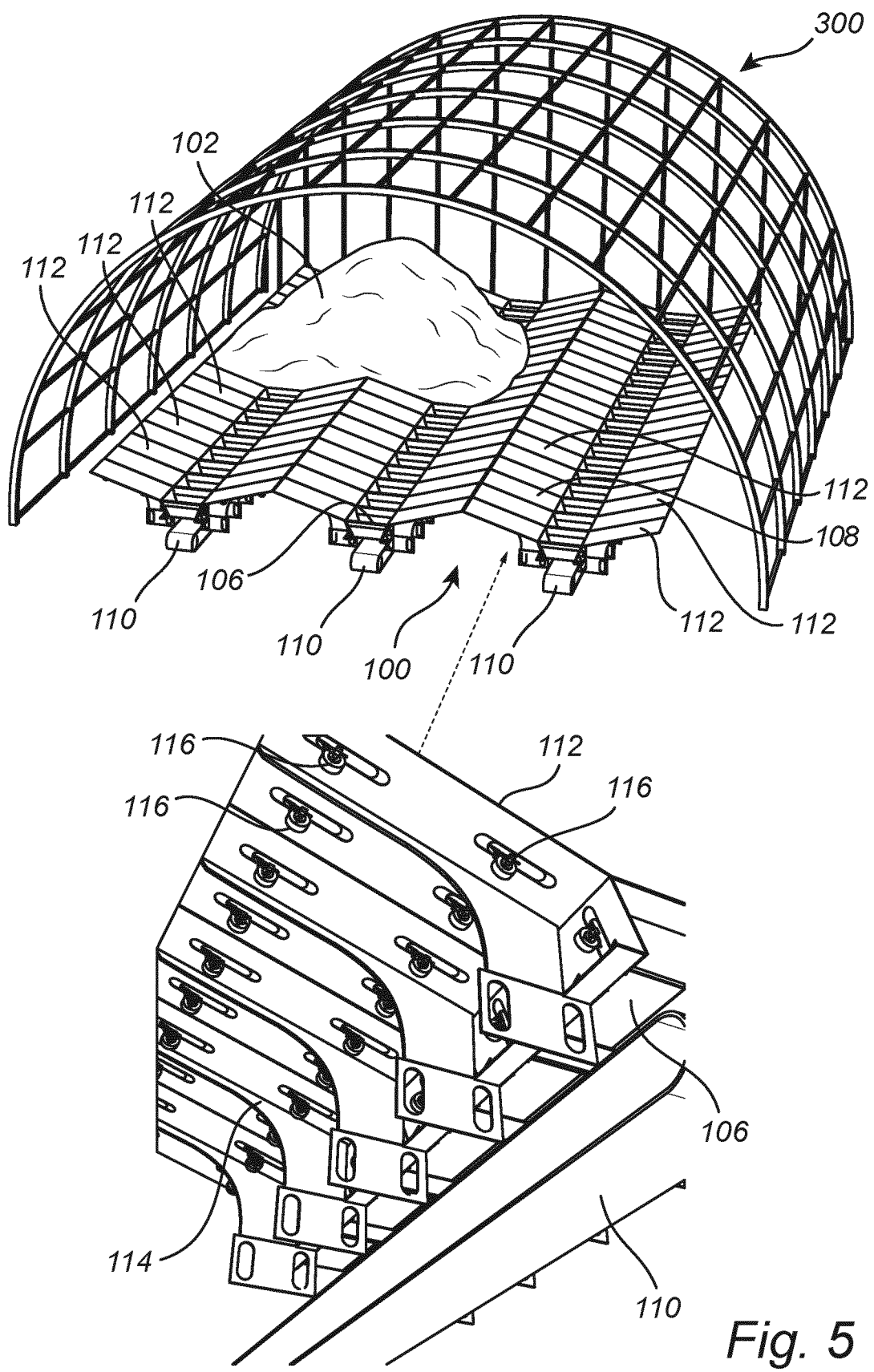
FIG. 5 conceptually illustrates a perspective view of a land-based storage equipped with storage and reclaim system according to the present inventive concept.

Now referring to FIG. 5 here is conceptually depicted a land-based storage 300 comprising a storage and reclaim system 100 of the above described kind. As can be seen in FIG. 5, the land-based storage 300 includes a number of modules each including two opposite support plates 112 being inclined towards a centrally located discharge port 106. A plurality of modules is arranged after on other in three rows in the depicted land-based storage 300. In other words, the storage and reclaim system 100 includes a plurality of modules each including support plates 112 and a discharge port 106. Moreover, the support palates 112 are provided with vibrators 116 and arranged supported in a free-floating manner on a support structure 114 as have been described in greater detail with reference to FIGS. 2-4. A conveyor 110 is arranged under respective row of discharge ports 106. Hence three conveyors 100 are used in the depicted land-based storage 300. It is to be understood that any number of modules may be arranged in any number of rows when designing a land-based storage 300 including a storage and reclaim system 100 of the above described kind. Hence, any number of support plates 112, vibrators 116, conveyors 110 etc. may be used to advantage in a land-based storage 300. A land-based storage 300 of the above kind is consequently a self-unloading land-based storage 300.

Figure 6:
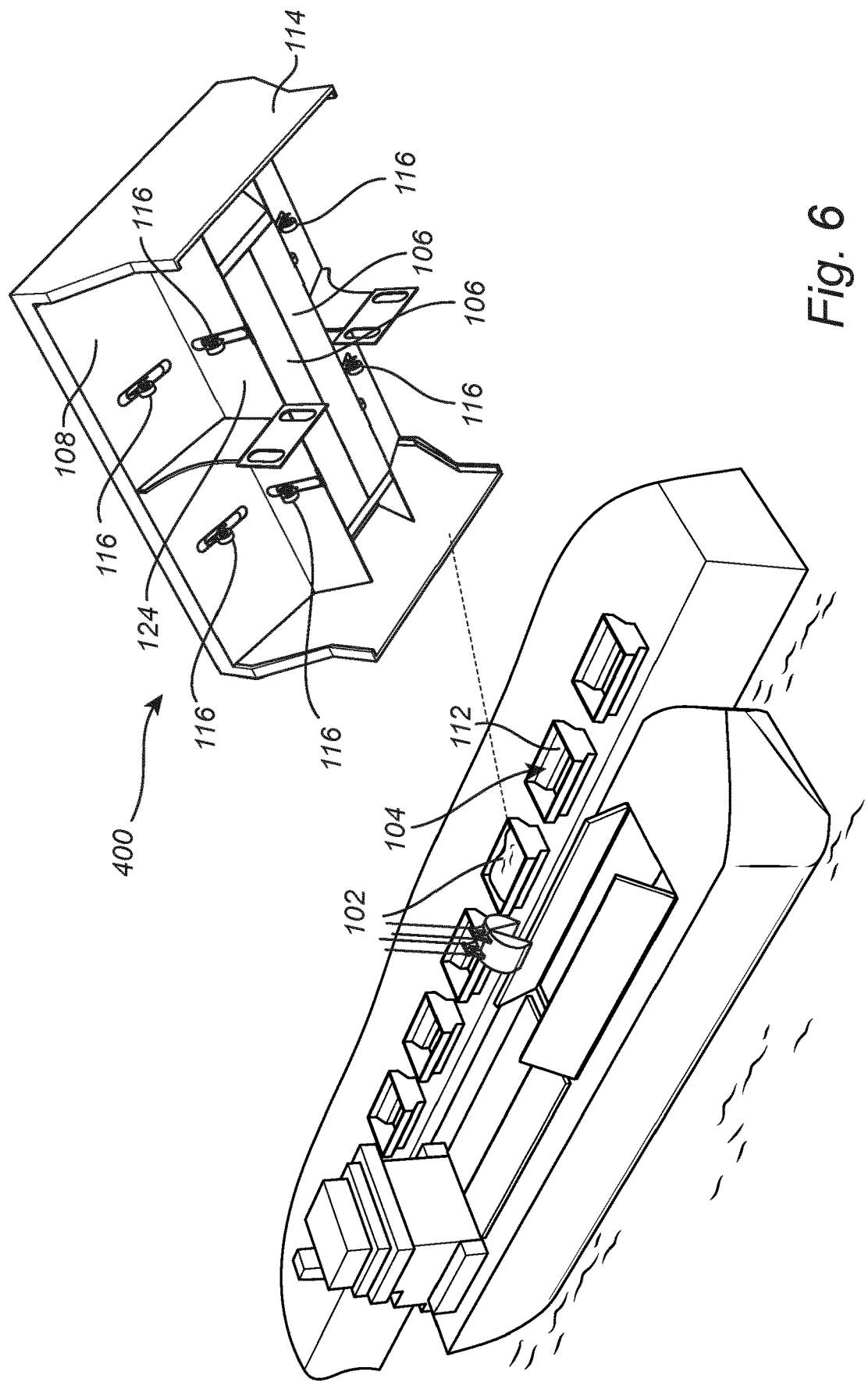
FIG. 6 conceptually illustrates a perspective view of a hopper equipped with storage and reclaim system according to the present inventive concept.

Now referring to FIG. 6 here is conceptually depicted how hoppers 400 are used for unloading a vessel. Each a hopper 400 comprising a storage and reclaim system 100 of the above described kind. The hopper 400 includes two opposite support plates 112 being inclined towards a centrally located discharge port 106. The support plates 112 are supported by a support structure 114 in a free-floating manner as have been described above in relation to FIGS. 2-4. Each support plate 112 is provided with two vibrators 116 of the above described kind. In other words, a typical hopper 400 includes a bulk material storage space 104 which tapers down towards a discharge port 106.

Bulk material 102 may be stored temporarily in the hopper 400 when for instance handling bulk material 102 at a vessel by means of a grab bucket. When unloading bulk cargo from a vessel as depicted in FIG. 6, a grab bucket may grab bulk material in the cargo hold of the vessel and subsequently drop the bulk material 102 into a hopper 400 located in proximity to the vessel, e.g. on a quay as depicted in FIG. 6.

Alternatively, a hopper 400 or hoppers 400 of the above kind may be located above deck on a vessel.

Conveyors, conveyor belts, transport screws or similar for conveying the bulk cargo form the vessel may typically be arranged below each hopper 400. The conveyors, transport screws or similar may be located at the vessel. The conveyors or similar may be located at a quay or dock.

The grab bucket or grab buckets used to unload the cargo hold of the vessel may be hoisted by a crane located above deck at the vessel itself. The grab bucket or grab buckets used to unload the cargo hold of the vessel may be hoisted by a crane located at a quay, dock, barge or similar.

A hopper 400 of the depicted type may be made significantly lower and hence lighter as compared to prior art hoppers. As an example, the weight of a hopper 400 with a bulk material handling capacity of 50 tonnes per run may be reduced from 90 tonnes to 30 tonnes. A reduced height and weight of the hopper 400 may reduce the roll of the vessel as compared to standard prior art hoppers when the hopper is mounted above deck on the vessel itself.

When the hopper 400 is used in conjunction with a large naval vessel and large cranes, a single grab by a grab bucket may drop 40-50 tonnes of bulk material 102 into the hopper 400. The bulk material 102 may then be stored temporarily or for a prolonged time in the hopper 400. The hopper may for instance be emptied in about 30-40 seconds even if 40-50 tonnes of bulk material 102 has been dropped therein. The hopper may in that case typically be emptied onto a conveyor, transport screws or other transport means.

Moreover, bulk material 102 may be stored for a prolonged time in a hopper 400 when for instance installing the hopper 400 in a storage tower. The discharge port 106 may exit over a conveyor, a transport screw or a cargo hold to give a few non-liming examples.

As have been described in detail above, the storage and reclaim system 100 may be used for a large variety of bulk materials. The storage and reclaim system 100 may for instance be used for handling of bulk materials 102 such as wood chips, wood pellets, sawdust, coal, ore, gypsum rock, bauxite, alumina, cement, sand, gravel, crushed rock, salt, grains and aggregates.

It will be appreciated that the present inventive concept is not limited to the variants and examples shown. Several modifications and variations are thus conceivable within the scope of the invention which thus is defined by the appended claims.

ITEMISED LIST OF EXEMPLIFYING EMBODIMENTS

IEE1. A storage and reclaim system for bulk material, said system comprising:
- a bulk material holding space having a bottom portion provided with a discharge port, wherein the bottom portion comprises an inclined support plate for supporting the bulk material and for assisting gravity induced feeding of the bulk material towards the discharge port,
- a support structure supporting the support plate, and
- one or more vibrators connected to the support plate and configured to transfer vibrational energy to the support plate to induce a vibrational movement of the support plate,
- wherein the support plate is supported by the support structure in a free-floating manner.

IEE2. The storage and reclaim system according to IEE1, in which the support structure comprises a backing plate, wherein the support plate rests on the backing plate.

IEE3. The storage and reclaim system according to IEE1 or IEE2, wherein each vibrator is connected to a major surface of the support plate facing away from the bulk material holding space.

IEE4. The storage and reclaim system according to IEE3, wherein each vibrator extends through an opening in the support structure.

IEE5. The storage and reclaim system according to any one of the preceding IEEs, wherein the system further comprises a clamping profile clamping a peripheral portion of the support plate and a peripheral portion of the support structure.

IEE6. The storage and reclaim system according to any one of the preceding IEEs, wherein the support plate is inclined with an angle in the range of 5-30 degrees with respect to a horizontal plane.

IEE7. The storage and reclaim system according to any one of the preceding IEEs, wherein the system further comprises an intermediate layer arranged between the support structure and the support plate, the intermediate layer having sound attenuating properties, vibration isolating properties and/or wear resistant properties.

IEE8. The storage and reclaim system according to any one of the preceding IEEs, wherein the discharge port further comprises one or more inclined discharge port plates for guiding the bulk material and for assisting gravity induced feeding of the bulk material towards the discharge port, wherein each discharge port plate is inclined with an angle in the range of 30-70 degrees with respect to a horizontal plane.

IEE9. The storage and reclaim system according to IEE8, wherein one or more vibrators are connected to each discharge port plate and configured to transfer vibrational energy to the discharge port plate to induce a vibrational movement of the discharge port plate, and wherein each discharge port plate is supported by the support structure in a free-floating manner.

IEE10. The storage and reclaim system according to any one of the preceding IEEs, the system further comprising an additional inclined support plate for supporting the bulk material and for assisting gravity induced feeding of the bulk material towards the discharge port form an opposite side thereof.

IEE11. The storage and reclaim system according to IEE10, wherein the additional support plate comprises one or more vibrators connected to the support plate and configured to transfer vibrational energy to the support plate to induce a vibrational movement of the support plate, wherein the additional support plate is supported by the support structure in a free-floating manner.

IEE12. The storage and reclaim system according to any one of the preceding IEEs, wherein each vibrator is independently controllable.

IEE13. The storage and reclaim system according to any one of the preceding IEEs, the system further comprising a conveyor arranged below the bottom portion of the bulk material holding space for receiving bulk material from the bulk material holding space via the discharge port.

IEE14. A vessel comprising a storage and reclaim system according to any one of IEE1-IEE13.

IEE15. A land-based storage comprising a storage and reclaim system (100) according to any one of IEE1-IEE13.

IEE16. A hopper comprising a storage and reclaim system according to any one of IEE1-IEE13.

IEE17. Use of a storage and reclaim system according to any one of IEE1-IEE13 for handling of bulk material chosen from group consisting of: wood chips, wood pellets, sawdust, coal, ore, gypsum rock, bauxite, alumina, cement, sand, gravel, crushed rock, salt, grains and aggregates.

The invention claimed is:

1. A storage and reclaim system for bulk material, said system comprising:
   a bulk material holding space having a bottom portion provided with a discharge port, wherein the bottom portion comprises an inclined support plate for supporting the bulk material and for assisting gravity induced feeding of the bulk material towards the discharge port,
   a support structure supporting the support plate, and
   one or more vibrators connected to the support plate and configured to transfer vibrational energy to the support plate to induce a vibrational movement of the support plate,
   wherein the support plate is inclined with an angle ($\alpha$) in the range of 15-25 degrees with respect to a horizontal plane,
   wherein the support plate is supported by the support structure in a free-floating manner,
   wherein the discharge port comprises one or more inclined discharge port plates for guiding the bulk material and for assisting gravity induced feeding of the bulk material towards the discharge port wherein each discharge port plate is inclined with an angle in the range of 30-70 degrees with respect to a horizontal plane,
   wherein one or more vibrators are connected to each discharge port plate and configured to transfer vibrational energy to the discharge port plate to induce a vibrational movement of the discharge port plate, and wherein each discharge port plate is supported by the support structure in the free-floating manner.

2. The storage and reclaim system according to claim 1, in which the support structure comprises a backing plate, wherein the support plate rests on the backing plate.

3. The storage and reclaim system according to claim 1, wherein each vibrator is connected to a major surface of the support plate facing away from the bulk material holding space.

4. The storage and reclaim system according to claim 3, wherein each vibrator extends through an opening in the support structure.

5. The storage and reclaim system according claim 1, wherein the system further comprises a clamping profile clamping a peripheral portion of the support plate and a peripheral portion of the support structure.

6. The storage and reclaim system according to claim 1, wherein the system further comprises an intermediate layer arranged between the support structure and the support plate, the intermediate layer having sound attenuating properties, vibration isolating properties and/or wear resistant properties.

7. The storage and reclaim system according to claim 1, the system further comprising an additional inclined support plate for supporting the bulk material and for assisting gravity induced feeding of the bulk material towards the discharge port from an opposite side thereof.

8. The storage and reclaim system according to claim 7, wherein the additional support plate comprises one or more vibrators connected to the support plate and configured to transfer vibrational energy to the support plate to induce a vibrational movement of the support plate, and
   wherein the additional support plate is supported by the support structure in the free-floating manner.

9. The storage and reclaim system according to claim 1, wherein each vibrator is independently controllable.

10. The storage and reclaim system according to claim 1, the system further comprising a conveyor arranged below the bottom portion of the bulk material holding space for receiving bulk material from the bulk material holding space via the discharge port.

11. A vessel comprising a storage and reclaim system according to claim 1.

12. A land-based storage comprising a storage and reclaim system according to claim 1.

13. A hopper comprising a storage and reclaim system according to claim 1.

14. Use of a storage and reclaim system according to claim 1 for handling of bulk material chosen from the group consisting of: wood chips, wood pellets, sawdust, coal, ore, gypsum rock, bauxite, alumina, cement, sand, gravel, crushed rock, salt, grains and aggregates.

* * * * *